Nov. 4, 1958  F. A. FARINET, JR  2,858,750
AUTOMATIC EXPOSURE CONTROL SYSTEM FOR AIRCRAFT
GUN CAMERA INSTALLATION
Filed Feb. 20, 1956  3 Sheets-Sheet 1

INVENTOR.
FRED A. FARINET JR.
BY
ATTORNEYS

United States Patent Office 2,858,750
Patented Nov. 4, 1958

2,858,750

AUTOMATIC EXPOSURE CONTROL SYSTEM FOR AIRCRAFT GUN CAMERA INSTALLATION

Fred A. Farinet, Jr., Dayton, Ohio, assignor to the United States of America as represented by the Secretary of the Air Force Application February 20, 1956, Serial No. 566,739

6 Claims. (Cl. 95—10)

(Granted under Title 35, U. S. Code (1952), sec. 266)

The invention described herein may be manufactured and used by or for the United States Government for governmental purposes without payment to me of any royalty thereon.

The present invention relates to an improved system and apparatus for the automatic regulation of the shutter exposure area of an aircraft gun camera. More particularly, this invention relates to an automatic exposure control system responsive to the electric output generated by a photocell to regulate the shutter exposure area of a conventional aircraft gun camera.

In ground photography, the existence of automatic exposure control systems which are responsive to, and include, a photoelectric sensing unit are well known in the art. The common types now in use, however, are not equipped to operate effectively in air-to-air photography; that is, the photography of airborne subjects from another plane in flight. The main disadvantages stem from the vibratory effects which the camera aircraft introduces within most present sensitive automatic exposure control systems.

In the past, it has been common practice to utilize the more stable manually controllable shutter opening in moving picture cameras on fighter aircraft; however, dependence upon the pilot to operate the camera shutter control is highly impracticable. Assuming that the shutter of the camera is adjustable to a number of exposure opening positions which the pilot may regulate to obtain the correct exposure for motion picture taking, it is exceedingly difficult for the pilot to guide the plane and also to regulate the exposure control for each change in the brightness level. Of course, it is also difficult to estimate the brightness level by aid of the human eye alone. It is thus an object of the present invention to provide an automatic exposure or shutter slit adjustment control system responsive to the electrical output generated by a photoelectric cell to accurately regulate the shutter exposure in which the automatic control system is not affected by vibration of the camera aircraft and may be accurately, automatically adjusted to correspond with the amount of light reflected upon the photoelectric cell.

A further object is the provision of an automatic exposure control system for automatically regulating the exposure area of a motion picture camera shutter without necessity of manipulation by the operator.

A further object is to provide an automatic shutter opening control system which is easily conformable for use with any of the standard aircraft gun cameras.

Another object is to provide an automatic exposure control system which is compact and efficient in operation, yet is inexpensive and will not require modification of existing aircraft gun cameras.

A further object is to provide an automatic exposure control system in combination with the photocell sensing unit and associated servo control means which is operable to regulate the exposure slit area of the motion picture camera system from the normal voltage furnished by the camera aircraft.

A still further object is to provide an automatic electrical control circuit which may be combined with the conventional aircraft gun camera exposure mechanisms, yet will permit manual and/or remote operation of the original camera exposure mechanisms by the operator.

The broad principle of operation of the present invention is to amplify the electric output generated by a photocell by means of an automatic exposure control circuit for operation of a control mechanism to adjust the shutter opening of the aircraft gun camera to a predetermined setting. In this way, the shutter opening may be adjusted to correspond with the electrical output of the photocell. The entire exposure system broadly consists in a multi-position control mechanism, each position corresponding with a particular shutter opening of the camera lens and each provided with an actuating circuit. Each actuating circuit, in turn, is selectively energized by an automatic exposure control system to direct the control mechanism to the corresponding shutter opening position. The automatic exposure control is made up of the following: a sensitive relay system electrically connected to the photocell to divide the photocell output, according to amplitude, into a plurality of ranges each corresponding to one of the actuating circuits; an energizing relay system interconnecting the aircraft electric power source and sensitive relay system with the actuating circuits to energize that actuating circuit corresponding to the range within which the photocell output lies by means of the power source; and an electric return circuit or hold circuit which interconnects the control mechanism and the energizing means to maintain energization of each actuating circuit in case the sensitive relay circuit connection is broken before the desired shutter setting is reached.

The present invention may be more fully understood by reference to the accompanying drawings in which.

To convey a clear understanding of the inventive features of the present invention, the description and operation of a conventional type aircraft gun camera and the automatic exposure control circuit will be combined. For purposes of illustration, the operation of a conventional aircraft gun camera electro-mechanical exposure control mechanism will be described, and the manner in which the automatic exposure control circuit is preferably connected to it.

Figure 1:
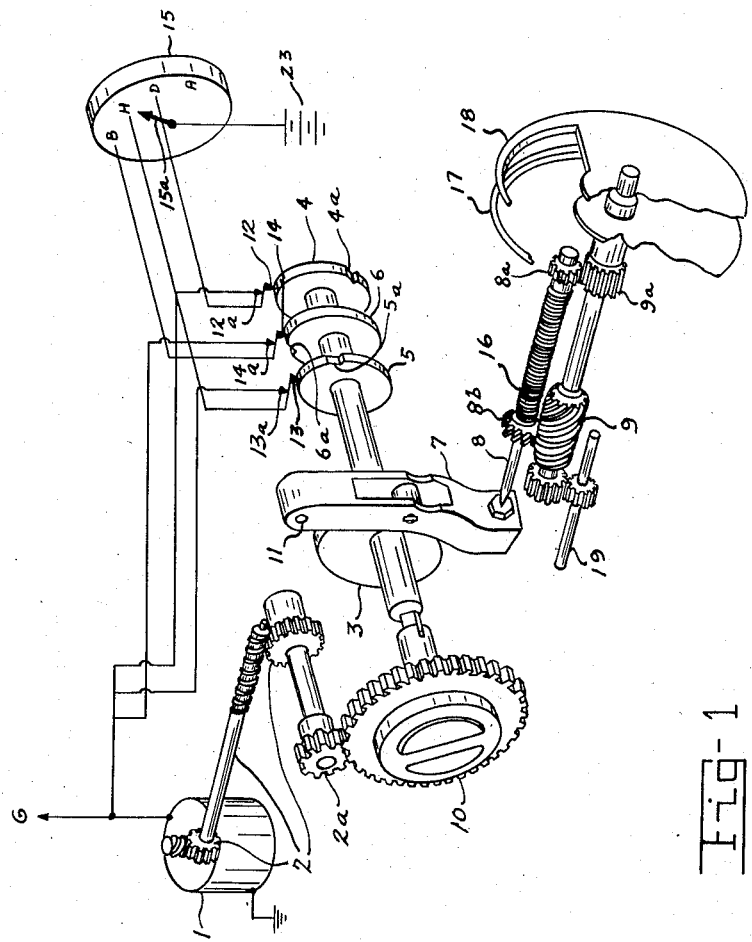
Fig. 1 is a somewhat fragmentary schematic perspective view of a conventional gun camera exposure control mechanism and its electrical connection with the automatic exposure control circuit.

There is shown in Fig. 1 the electro-mechanical exposure control mechanism which is both manually and electrically operable. In manual operation, the shutter control knob 10 is depressed to disengage the pinion 2a of the gear train 2. Rotatable upon the same shaft as the control knob 10 are the cam 3 and cam switches 4, 5, and 6. By turning the knob 10, the cam 3 will be rotated, and the shutter slit control lever 7 which is pivoted at 11, will thus either be forced forward by the cam 3, or the lever will be permitted to move backward due to the force of the return spring 16. The forward movement of the lever 7 will force the displacement shaft 8 forward causing relative rotation of the shaft 8, gear 8a, and gear 9a, the latter gear being rotatable independently of and journalled on the worm shaft 9 to rotate the shutter blade 17, as the worm gear 8b is shifted along the worm on shaft 9, independently of the shutter blade 18 which is fixed on shaft 9 thereby increasing or decreasing the shutter angle opening for the shutter setting.

Figure 2:
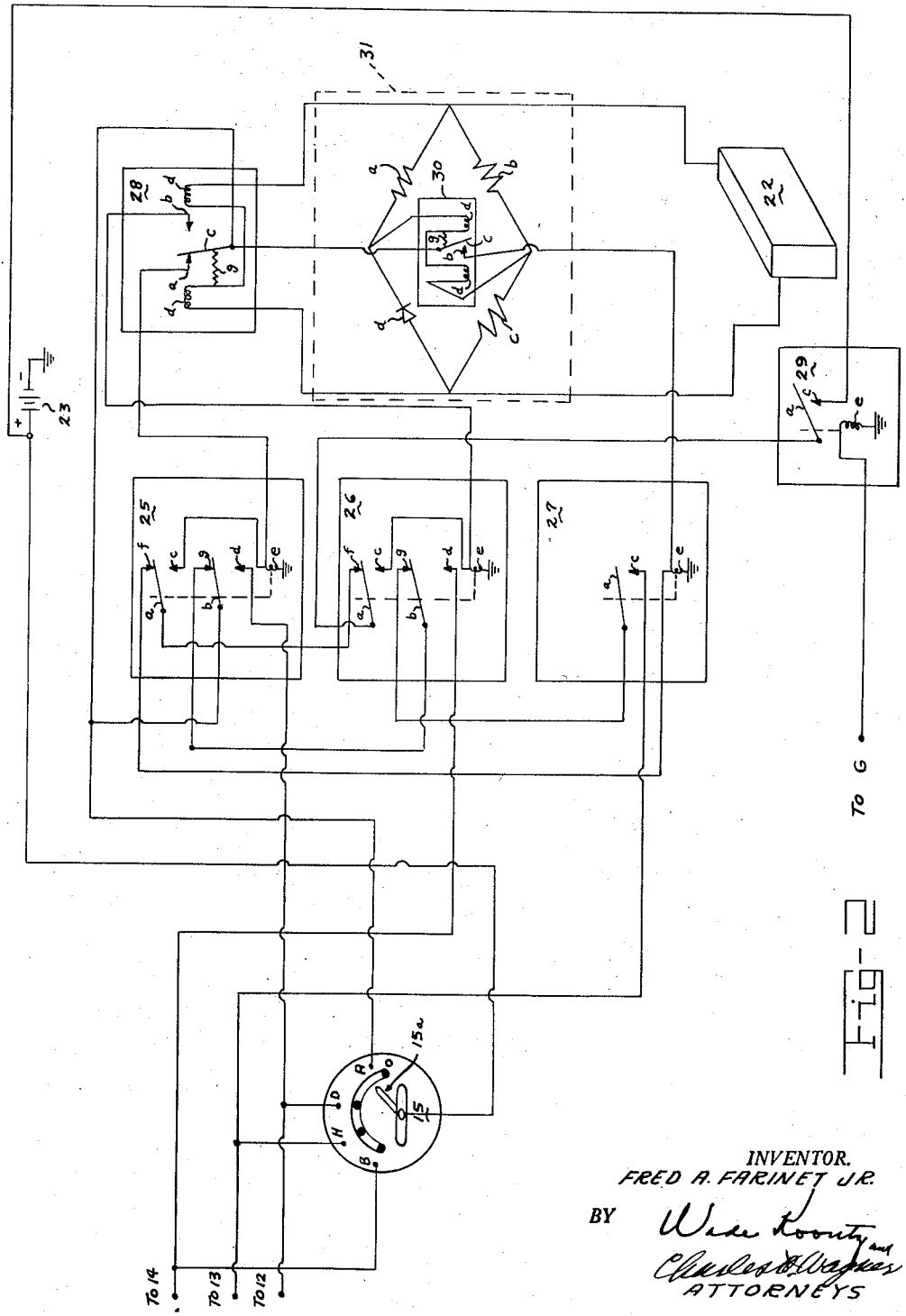
Fig. 2 is a schematic view of a wiring diagram of the automatic exposure control system in combination with a photoelectric cell.

In addition to the manual control, the exposure control mechanism may also be electrically operated by movement of the remote shutter control switch 15 to one of three positions (Bright, Hazy, or Dull). Each of the positions, Dull (D), Hazy (H), and Bight (B) is connected to an actuating circuit, each actuating circuit including one of the followers 12, 13, and 14 riding on the cams 4, 5, and 6 respectively, and one of the switch contacts 12a, 13a and 14a respectively. A lead is connected from the voltage source 23 of the aircraft into the remote shutter control switch box 15, as shown in Fig. 2. Setting of the remote control indicator 15a to one of three positions, B, H, or D will then close the circuit from the voltage source 23 into one of the actuating circuits to operate the motor when any one or more of the circuits are closed.

Each of the switch contacts is located to follow the contour variations of the cam switches, each of the three cam switches being provided with a V-shaped notch 4a, 5a, and 6a. Positioned above each of the contacts of followers 12, 13 and 14 are the switch contacts 12a, 13a, and 14a connected to the motor to establish contact with the followers when the latter are resting on the periphery of the cam switches; however, when any one of the followers drop into one of the notches 4a, 5a, or 6a that follower contact will break contact with that switch contact thereby stopping the motor. When the indicator is turned to the D position, the voltage source 23 will energize the control motor 1 through the follower 12 and the switch contact 12a positioned on 12. With the control knob 10 in engagement with the pinion 2a of gear train 2, the knob 10, cam 3, and cam switches 4, 5, and 6 will be rotated by the motor through the gear train 2, the cam 3 controlling the effective area of the opening in the shutter blade 17. The cams 4, 5, and 6 will continue to rotate until the notch 4a on cam 4 comes into position under the follower 12, the follower dropping into the notch 4a to cause separation between the follower 12 and contact 12a, thus opening the circuit to stop the motor and arrest rotation of the cam 3. Each notch 4a, 5a and 6a is located on the cam to interrupt the actuating circuit to the motor at a point corresponding to the indicator position on the remote control switch box 15, thereby obtaining the desired shutter opening or slit area for the exposure indicated on the switch box 15 for D, H, and B light conditions.

The automatic exposure control circuit, shown in Fig. 2, is connected to the control mechanism in such a way that either the manual or remote electrical operation heretofore described may be used, or by the simple expedient of turning the indicator 15a to automatic position A on the switch box 15, the automatic system is put into effect.

In my preferred embodiment shown in Fig. 2, somewhat diagrammatically, the sensitive relay system of the automatic circuit includes the sensitive relay 28 having the normally closed contacts a—c, and normally open contacts b—c, the contact arm 28c shown biased in position against contact 28a by the spring 28g; the sensitive relay 30 having the normally open contacts 30b—c, arm 30c being held in a normally open position by spring 30g; and the bridge circuit 31, which contains the relay 30, having the resistances 31a, b, and c and the diode 31d. The energizing relay system includes the relays 25 and 26 having the normally closed contacts a—f and b—g and normally open contacts a—c and b—d, and relay 27 having the normally open contacts a—c. The electric return circuit includes the lead wire G electrically connecting the motor 1 to the relay 29, the relay 29 having the normally open contacts a—c. The electric power or voltage source 23 from the aircraft leads into the switch box 15 to the remote indicator 15a.

When indicator 15a is at position A (Fig. 2), the source 23 is then connected through the indicator arm 15a to contact b of relay 25, contact arm c of sensitive relay 28 and contact arm c of sensitive relay 30. A separate lead from source 23 is connected to the contact c of relay 29. The photocell 22, electrically connected across the bridge circuit 31 and the armature coils d of relay 28 will develop an electrical output, across the bridge circuit in the coils d of relay 30, and also into the coils d of relay 28 in proportion to the light level received, to cause movement of the sensitive contact arms c of relays 28 and 30 respectively. It is the function of the sensitive relay arms c of relays 28 and 30 to be displaced to three positions by the photocell output: the D position, corresponding with the Dull light range, is where contact arm c of relay 28 is in spring-biased position against contact a of relay 28; the H position, when in the Hazy range, is when the contact arm c of relay 30 is displaced by the photocell output against contact b of relay 30; the B position, when in the Bright range, is when the contact arm c of relay 28 is displaced against contact b of relay 28. For each of the above positions, a corresponding relay is provided in the energizing relay system: Relay 25 interconnects contact a of relay 28 with follower 12; relay 26 interconnects contact b of relay 28 with follower 14, relay 27 interconnects contact b of relay 30 with follower 13, as shown in Fig. 2. When the sensitive contact arms c of relays 28 and 30 are displaced to one of the light range positions D, H, or B, a circuit is estatblished from the stronger power source 23 through that light range position and into the corresponding energizing relay coil e connected to the contacts of each position, each relay being thereby energized by the current from source 23. Each energized relay, in turn, establishes a circuit from the same source 23 through the switch contact d connected to the energized relay for operation of the motor 1. In this way, the desired shutter setting will be obtained in the control mechanism in response to the amount of light level received by the photocell, thereby eliminating the necessity of regulating the remote control indicator 15a to the corresponding light range position on the switch box 15.

Figure 3:
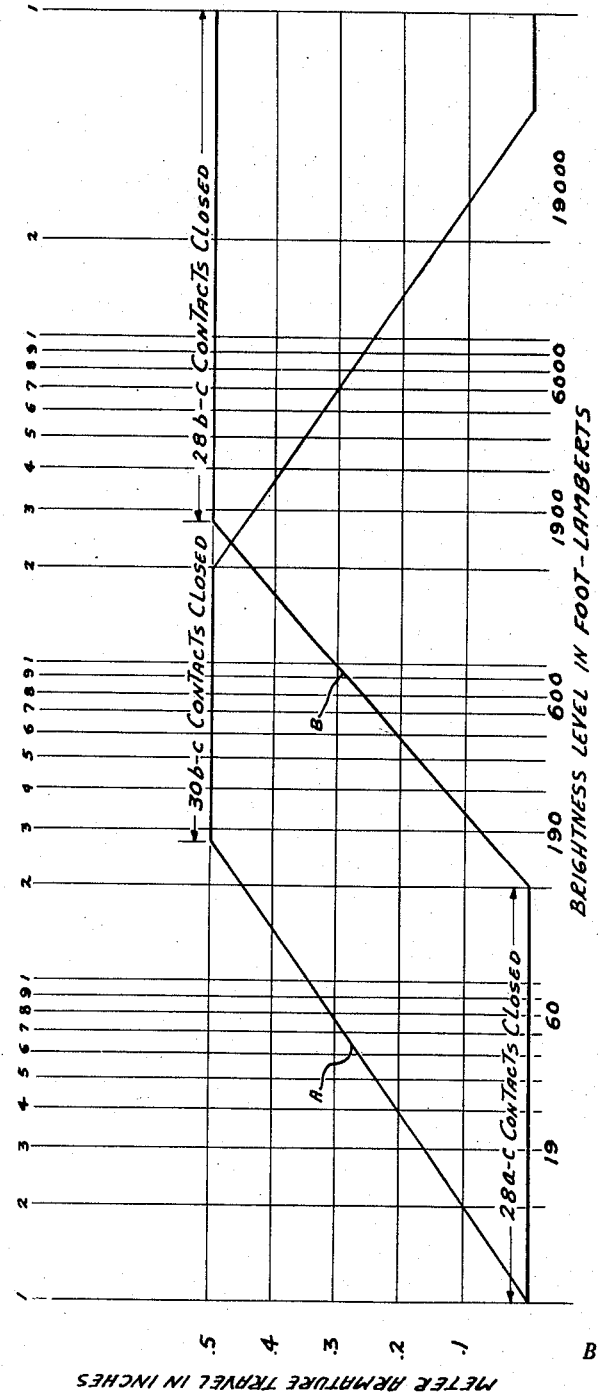
Fig. 3 is a graph which is plotted to indicate the meter armature travel of the exposure control circuit against the light level of the subject being photographed.

The curves A and B in Fig. 3 illustrates more clearly the effect of the increase in photocell output on the travel of contact arms c of relays 28 and 30. Along the horizontal axis is plotted the independent factor, the brightness level, which determines the output level developed by the photocell, measured in foot-lamberts and ranging up to 19,000 foot-lamberts. The vertical axis represents the armature travel, in inches, of the armatures d or contact arms c of relays 28 and 30. The curve A represents the movement of contact arm c of relay 30; the curve B represents the movement of contact arm 28c in response to the movement of the respective armatures to which they are connected.

It is the function of the bridge circuit 31 to control the flow of current through the relay 30, thereby controlling the displacement of the relay contact arm c of relay 30 to correspond with the movement of contact arm c of relay 28. Thus, in the D range, diode 31d will shunt the photocell current into the armature coil d of relay 30. The relay contact arm c of relay 30 is made to be immediately displaceable by the movement of armature coil d of relay 30 in the D range to gradually swing to the closed position against contact b of relay 30. In the H range, the diode will continue to divert the flow of current into the sensitive relay coil d of relay 30 to maintain the contact arm c of relay 30 in a closed position; however, as the current continues to increase into the B range, the diode d of 31 will act as a conductor for the higher current and will gradually balance the bridge circuit thereby reducing and eventually eliminating its diversion of the current into the relay coils d of relay 30. Contact arm c of relay 30 will thus gradually return to an open position in the B range.

The combined arm movements are as follows: With a continuous increase in light level from 0 to 190 foot-lamberts, the contact arm c of relay 30 will be displaced in proportion to the increase in current from its resting position toward the contact b of relay 30; for the same increase, contact arm c of relay 28 will remain in the spring-biased position against contact a in relay 28 until the current through the armature coil 28d from the photocell is sufficient to overcome the force of the spring, sufficient current being generated for this purpose just prior to the 190 foot-lambert level, as shown.

As the light level increases from 190 to 1,900 representing the Hazy range, the contact arm c of relay 28 will move to an intermediate position from contact a of relay 28 toward contact b of relay 28. At the same time, electrical contact has been made between contacts c and b of relay 30 during the increase up to about 1,750 foot-lamberts. Over 1750 foot-lamberts, the diode d of 31 will cause gradual balance in the bridge circuit in proportion with the increasing light level, to return the contact arm c of relay 30 to an open position.

In the 1,900 to 19,000 foot-lambert range, and as contact arm c of relay 30 is returning to open position, the contact arm c of relay 28 will have reached a closed position against the contact b in relay 28 and remains in this position for the continued light increase in the B range.

Ideally, each contact should be made as the contact of the other relay is broken; however, this synchronization of contact opening and closing cannot be attained in practice, since a certain light level interval must separate the opening and closing points at each new light range in proportion to the effect of vibration upon the contacts. To insure opening of one contact before the following one is made, the break point for contact arm c from contact a of relay 28 is set at 1,750 foot-lamberts, and the closing of contact arm c with contact b in relay 30 is made at the 1,900 foot-lambert point, as shown in Fig. 3. Again at the end of the range, the contact is broken in relay 30 at about 10,400 foot-lamberts, and the contact made in relay 28 at 11,400 foot-lamberts.

The combined action of the two relays in establishing an electrical contact at each of the three light level ranges provides in essence the equivalent action of a single pole triple throw relay. Of course, it would be difficult, if not impossible, to utilize a triple throw relay for the above operation, the main problem being to establish a definite intermediate contact position for the movable contact arm strong enough to hold the arm in position against the vibration of the plane, yet permit the arm to travel to the next position. This problem becomes particularly acute where a sensitive relay is required to respond to the weak photocell current, and a reliable contact must be made against contact bounce and vibration of the plane.

When the brightness level of the subject is low, corresponding to the D range of the remote control switch 15, a circuit will be established for the flow of current from voltage source 23 through contacts in the automatic position A on control box 15, movable contact arm c of relay 28, and contact a of relay 28, and into the coil e of relay 25 to close the contacts a—c and contacts b—d of relay 25. The relay 25 is thereby energized for the introduction of current from the voltage source 23 through contacts in the control switch 15 at automatic position A, closed relay contacts b—d of relay 25, follower 12, and switch contact 12a for the starting of the motor 1 to adjust the shutter opening 10 to a position corresponding to the current generated in the photocell 22.

During the operation of the motor 1 in the D range, the lead wire G from the motor 1, and connected to the armature coil e of relay 29, will conduct the return voltage from the motor 1 closing the contacts a—c of relay 29 for the flow of the return current through relay 29 into the contacts a—f of relay 26 into the closed contacts a—c of relay 25 and then to armature coil e of relay 25 to the ground. In this manner, the current from relay 28 will be supplemented by the return current from the motor to retain the closed switch 25 in the energized position against the vibrational effects introduced by the plane in the sensitive relay contacts 28. Without such a return circuit, contact will possibly be broken in the energizing circuit at the point of contact of the contact arm c of relay 28 with the contacts a and b of relay 28 either due to contact bounce of the sensitive relay arms or due to the effect of vibration of the plane before the desired shutter setting has been reached.

The control motor 1 will continue to rotate the gear train and cam mechanism 3 for adjustment of the shutter blades 17 and 18 until the cam notch 4a comes into position under follower 12, at which time follower 12 will drop into the slot 4a, thereby breaking contact with the switch contact 12a and stopping operation of the motor. As a result, the hold circuit or return circuit will also be deenergized, the relay 25 returning to an open position.

With an increase in brightness level, corresponding to the H range, sufficient current will be generated by the photocell to displace the movable contact arm c of relay 28 against the bias of the return spring g of relay 28 to a neutral position, and to swing relay contact arm c of relay 30 to a closed position against contact b of relay 30. In the above position, the current of the voltage source 23 will flow through the closed relay 30, instead of open relay 28, into the coil e of relay 27 to close the contacts a and c of relay 27 and to thereby close the circuit from the voltage source 23 through contacts of the indicator 15 in automatic position A, the open relays 25 and 26 respectively, closed relay 27, and the switch contact 13a through the control motor 1. The hold circuit operation will be the same in the H range as in the D range, except that the relays 25 and 26 will both be open and relay 27 closed. In this way, the current will flow from the control motor 1 through relay 29, will continue from the open relay 26 through the contacts a—f of relay 25, and into armature coil e of relay 27 to supplement the voltage flow from the relay 30. When follower 13 drops into notch 5a, motor 1 will again stop to deenergize the hold circuit, and relay contacts a—c of relay 27 will open.

With an increase in brightness level corresponding to the B range, sufficient current will be generated by the photocell to displace the movable arm c of relay 28, and arm c of relay 30 will return to the open position through the contact b of relay 28. The current of voltage source 23 will, therefore, flow through the contact arm c of relay 28 and contact b of relay 28 into the coil e of relay 26 to actuate this relay in the same manner as relay 25 is actuated in the B range. The normal load circuit from the voltage source 23 is then established through contacts in the automatic position A, the closed contacts b—d of relay 26 and the switch contact 14a into the control motor 1. A hold circuit will again be established in the B range, the return current from the motor passing through the relay 29, deenergized relays 25 and 27, and into closed relay 26, the current passing into the armature coil e of relay 26 to hold the load circuit closed.

In the above manner of operation, it is thereby possible to utilize a sensitive meter relay system responsive to a weak photocell current, and to reduce any intermittent stopping and starting of the motor due to the contact bounce of the sensitive meter relay arms or vibrational effects of the camera aircraft on the sensitive relay arms by supplementing the weak photocell current operation with the stronger current flow returning from the motor.

Obviously, the above description is merely for the purpose of illustration. Various other modifications may be devised which come within the scope of the present invention as defined in the appended claims.

What is claimed is:

1. An automatic camera exposure control system comprising a multi-position electrically operated exposure control mechanism having a plurality of actuating circuits each relating to one position of said control mechanism, a photocell, sensitive relay means in circuit with said photocell and responsive to the output of said photocell for selectively applying electric power to one of said actuating circuits at a time depending upon the output level of said photocell, and means connected between said control mechanism and the preceding means and operative upon application of power to said control mechanism through one of said actuating circuits at a time to maintain the application of power to one of said circuits until a predetermined position of adjustment of said exposure control mechanism has been reached, said first named means comprising a diode connected across one of said actuating circuits acting as a conductor when the output level of said photocell has reached a predetermined minimum.

2. In a photographic exposure control system comprising a multi-position electrically operated exposure control mechanism having a plurality of actuating circuits each having coil-operated switch contacts relating to a different position of said control mechanism and a multi-position manually operated switch connected between a source of electric power and selected coil operated switch contacts of said actuating circuits for selectively energizing one of said circuits at a time for adjusting said exposure control mechanism to a desired predetermined position, and in which said mechanism contains a plurality of relays electrically interconnected with the coil-operated switch contacts of said actuating circuits and operative when said mechanism is in any of its predetermined positions for interrupting the corresponding energized actuating circuits; light responsive apparatus electrically interconnected with a selected relay of said plurality of relays for automatically energizing said actuating circuits, said apparatus comprising: a photocell adapted to receive light proportional to the light reflected from a subject to be photographed and electrically connected across one of said relays and to the coils of another of said relays, bridge circuit means connected across said first-named relay for dividing the output of said photocell according to the light level received into a plurality of ranges progressively actuating a selected one of said actuating circuits in accordance with a predetermined light level, and means connected between said exposure control mechanism and said bridge circuit means and operative when said control mechanism is energized through said related actuating circuit to maintain energization of said related actuating circuit until said exposure control mechanism is adjusted to a position corresponding to the output of said photocell.

3. In a photographic exposure control system having a three-position electrically operated exposure control mechanism, three actuating circuits each relating to one of said three positions and each connected to said mechanism through a switch contact actuated by said control mechanism to interrupt the actuating circuit when said mechanism is in the corresponding position, apparatus for automatically applying power to said actuating circuit, said apparatus comprising: a photocell adapted to receive light proportional to the light reflected from the subject to be photographed, first sensitive relay means electrically connected to said photocell and having shunt means responsive to the output thereof normally deenergizing said relay means at a predetermined light level received by said photocell, second sensitive relay means also connected to said photocell and having a pair of armature coils in circuit therewith responsive to a photocell output at a light level received by said photocell above said predetermined light level, energizing relay means interconnecting said first and second sensitive relay means and each actuating circuit and adaptable to apply electric power to energize each actuating circuit for operation of said control mechanism to a selected, predetermined position.

4. In a photographic exposure control system having a three-position exposure control mechanism, an electric motor for driving said mechanism to any of three predetermined positions, three motor energizing circuits each relating to one of said three positions and each connected to said motor through a position switch contact actuated by said control mechanism to open the energizing circuit when said mechanism is in the desired predetermined position, and having a three-position manually operated switch connected between a source of power and said motor energizing circuits for selectively connecting said circuits to said source of power, automatic control circuit apparatus for automatically selectively applying power to said motor energizing circuits, said apparatus comprising: a photocell adapted to receive light proportional to the light reflected from an object to be photographed and having a proportional electrical output, a first sensitive relay having normally closed and normally open sets of contacts and an energizing coil, a second sensitive relay having a set of normally open contacts and an energizing coil, means for applying the output of said photocell to the coils of said relays and means comprising a nonlinear electrical network connected between the coil of said second relay and said photocell for energizing said second relay coil to cause the contacts of said second relay to close at a photocell output substantially the same as that at which the normally closed contacts of said first relay open and to reopen at a photocell output substantially the same as that at which the normally open contacts of said first relay close, third and fourth relays each having two sets of normally closed and two sets of normally open contacts, a fifth relay having a set of normally open contacts, said third, fourth and fifth relays having energizing coils, means connecting said power source to the coil of said third relay through the normally closed contacts of said first relay, means connecting said power source to the coil of said fourth relay through the normally open contacts of said first relay, means connecting said power source to the coil of said fifth relay through the contacts of said second relay, means connecting said power source to one of said motor energizing circuits through one set of normally open contacts of said third relay, means connecting said power source to another of said motor energizing circuits through one set of normally closed contacts of said third relay and one set of normally open contacts of said fourth relay, means connecting said power source to the remaining motor energizing circuit through said one set of normally closed contacts of said third relay, one set of normally closed contacts of said fourth relay and the contacts of said fifth relay.

5. The exposure control system as claimed in 4, said automatic control circuit apparatus further comprising a sixth relay having a set of normally open contacts, means for energizing the coil of said sixth relay during energization of said motor, means connecting the coil of said third relay to said source of power through the second set of normally open contacts of said third relay, the second set of normally closed contacts of said fourth relay and the contacts of said sixth relay, means connecting the coil of said fourth relay to said power source through the second set of normally open contacts of said fourth relay and the contacts of said sixth relay, and means connecting the coil of said fifth relay to said power source through the second set of normally closed contacts of said third relay, the second set of normally closed contacts of said fourth relay and the contacts of said sixth relay.

6. An automatic exposure control system having a multiposition exposure control mechanism comprising an electric motor for driving said control mechanism to a selected position, a plurality of motor energizing circuits each corresponding respectively to one of said multipositions and each connected to said motor through a position switch contact actuated by said control mechanism to open a corresponding motor energizing circuit when said control mechanism is in said selected position, a pair of sensitive relay means respectively having pairs of normally open and closed contacts under control of relay-actuating coils respectively energizable by predetermined varying amounts of electrical output delivered thereto, control circuit means for automatically applying power selectively to the relay-actuating coils of said pair of sensitive relay means comprising a photocell receiving varying amounts of light and adapted to deliver electrical output in proportion to the light received to actuate one of said pair of sensitive relay means for a given output and the other of said pair of sensitive relay means for an output in excess of said given output, a plurality of secondary relays each having normally open and closed contacts and energizing means, means applying said power to one of said plurality of secondary relays through the normally closed contacts of one of said pair of sensitive relays, means applying said power to the other of said pair of sensitive relays through the normally open contacts of said first-named sensitive relay, means for applying said power to the normally open contacts of one of said secondary relays through the normally open contacts of said last-named sensitive relay, said power source connected between each of said motor energizing circuits and the normally open contacts of said secondary relay, the normally closed contacts of said secondary relay and the normally open contacts of a second one of said secondary relays, and the normally closed contacts of said first two-mentioned secondary relays and the contacts of another of said secondary relays, one of said pair of sensitive relays having a bridge circuit comprising a plurality of resistances and means controlling current flow through said relay, said last-named means comprising a shunt connected across one of said sensitive relays actuating said sensitive relay when the light received by said photocell is less than a predetermined minimum and by-passing said first-named sensitive relay and actuating the other of said sensitive relays when the light level received by said photocell is greater than said predetermined minimum.

References Cited in the file of this patent

UNITED STATES PATENTS

| | | |
|---|---|---|
| 1,312,289 | Wenderhold | Aug. 5, 1919 |
| 2,343,206 | Rath | Feb. 29, 1944 |
| 2,393,407 | Peterson | Jan. 22, 1946 |
| 2,393,408 | Peterson | Jan. 22, 1946 |
| 2,417,506 | Lamb | Mar. 18, 1947 |
| 2,453,693 | Armstrong et al. | Nov. 16, 1948 |
| 2,599,048 | Dicke | June 3, 1952 |
| 2,655,848 | Gray | Oct. 30, 1953 |
| 2,683,402 | Bruck | July 13, 1954 |
| 2,710,935 | Luebking | June 14, 1955 |
| 2,726,359 | Ray | Dec. 6, 1955 |